United States Patent Office 3,629,408
Patented Dec. 21, 1971

3,629,408
COMPOSITION OF CHLORINATED GLYCOLURILS
AND METALLIC HYPOCHLORITES
Roland J. Horvath, South Euclid, and Charles G. Parsons, Mentor, Ohio, assignors to Diamond Shamrock Corporation, Cleveland, Ohio
No Drawing. Filed Aug. 28, 1969, Ser. No. 853,968
Int. Cl. A61l 13/00
U.S. Cl. 424—149
10 Claims

ABSTRACT OF THE DISCLOSURE

Compositions of metallic hypochlorites and an additive of a chlorinated glycoluril are presented. These compositions are useful in treating sewage media as the compositions initially eliminate bacteria and prevent regrowth of bacteria in the treated media.

BACKGROUND OF THE INVENTION (1) Field of the invention

The present invention relates to novel sterilizing, sanitizing and/or disinfecting compositions and to their utilization to eliminate and prevent regrowth of bacteria in sewage media. In greater detail this invention presents compositions of metallic hypochlorites and an additive of a chlorinated glycoluril which have unexpected properties not found when the components of this composition are used separately.

(2) Description of the prior art

While it is known in the art that an alkali or alkaline earth metal hypochlorite per se (particularly calcium hypochlorite) are chemical compounds which may be use of calcium hypochlorite in such applications has disadvantages. Calcium is difficult to form and hold in certain desired shapes, such as cylindrical shapes, for charging to an apparatus used to treat the aqueous media and its erosion rates are too high for practical commercial purposes thus giving a consistent rapid reduction in bacteriological count in sewage media which is rapidly dissipated and does not give the long-term bacteriological control desired in treating such media.

SUMMARY OF THE INVENTION

The disadvantages of using a metallic hypochlorite, particularly calcium hypochlorite, are overcome by the compositions disclosed herein as shown from the accompanying description and data hereinafter set forth, in which a chlorinated glycoluril is incorporated into a metallic hypochlorite. The compositions of this invention initially reduce and maintain control over regrowth of bacteria in sewage better than the individual ingredients of the compositions alone.

It is accordingly one object of the present invention to provide sterilizing, sanitizing and/or disinfecting compositions, in various shapes, comprising chlorine-containing compounds from which available chlorine can be released in aqueous media over a predetermined period of time and over prolonged periods of time. Another object of this invention is to provide novel, stable compositions, one major component of which is an alkaline earth metallic hypochlorite compound enabling sufficient release of chlorine in treating aqueous media to eliminate undesired organisms from such media. Still further objects and advantages of the present invention will be apparent from the following description and the appended claims.

DESCRIPTION OF THE PREFERRED EMBODIMENTS

The present invention provides compositions capable of being utilized in a variety of physical forms comprising a combination of two different classes of components of (a) a metallic hypochlorite compound which readily releases its available chlorine in an aqueous medium upon contact with the aqueous medium and (b) a chlorine substituted compound represented by the following structure:

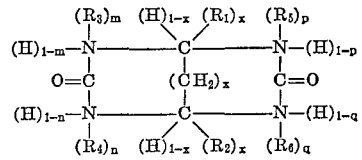

where $R_1$ and $R_2$ are lower alkyl radicals from 1 to 4 carbon atoms and $R_3$, $R_4$, $R_5$ and $R_6$ are chlorine and $x$, $m$, $n$, $p$ and $q$ are each integers from 0 to 1, inclusive, with at least one of $m$, $n$, $p$ and $q$ being 1. In most instances $R_1$ and $R_2$ are the same or different lower alkyl groups such as a methyl group or other alkyl groups containing up to 4 carbon atoms.

Specific illustrative compounds of the above chlorine substituted glycoluril compounds include 1,3,4,6-tetrachloroglycoluril having the structure:

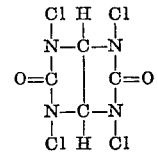

1,5 - dimethyl - 2,4,6,8, - tetrachloro - 2,4,6,8 - tetrabicyclo(3.3.1) - nonan - 3,7 - dione having the structure:

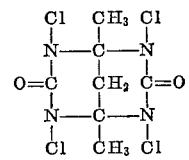

and dichloroglycoluril having the structure:

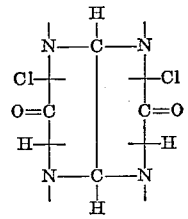

Of particular interest are 1,3,4,6-tetrachloroglycoluril and dichloroglycoluril, which have been found to exhibit excellent disinfectant characteristics when combined with a metallic hypochlorite for the treatment of aqueous sewage effluent within acceptable limits with regard to health and sanitation standards. More specifically, in a preferred embodiment the present invention provides compositions comprising mixtures of calcium hypochlorite and a chlorinated glycoluril where the chlorinated glycoluril is 1,3,4,6-tetrachloroglycoluril, dichloroglycoluril and 1,5-dimethyl - 2,4,6,8 - tetrachloro - 2,4,6,8 - tetrabicyclo (3.3.1)-nonan-3,7,-dione.

The compositions of this invention are otherwise substantially free from other organic materials and have excellent storage stability in the presence of air and will controllably release available chlorine, in aqueous media such as cooling tower water and swimming pool water and in sterilizing, sanitizing and/or disinfecting operations over a predetermined period of time or over prolonged periods of time as desired.

In a preferred embodiment of the invention, the compositions comprise (a) up to 25% by weight of the chlorinated glycoluril component (b) with the balance being a metallic hypochlorite. A more preferred embodiment of the invention has the composition comprising (a) up to 10% by weight of the chlorinated glycoluril component with the balance being a metallic hypochlorite. Compositions can contain from about 2% by weight to about 25% by weight of the chlorinated glycoluril component with the balance being a metallic hypochlorite.

The general process for preparing the compositions of this invention usually entails the steps of mixing the ingredients together to form a uniform mixture and, if the composition is to be employed in other than powder form, compressing the mixture under pressure to form the desired physical shape of the composition.

The mixing (preferably by mechanical means) of the various ingredients, prior to compression into the desired configuration, may be accomplished in a number of ways commonly employed in mixing dry or substantially dry materials such as, for example, by stirring, tumbling and the like. Mixing should be carried out in such a manner that the particle size of the components being mixed is not appreciably altered in mixing the dry materials. Tumbling is a preferred way of carrying out the mixing step. By this mixing step, a dry flowable and uniform mixture is formed which can be used in powder form if desired, or if desired can be compressed into a variety of configurations. These mixtures can then be compressed or converted into a variety of configurations as desired by employing various apparatuses or presses, such as a Colton Press or a Carver Press.

Various ranges of applied pressure for various times may be used to compact the mixture into the desired configurations, and the dispersion time of the finished product is not substantially affected by the compression pressure and the compression time employed. Thus by way of example a predetermined amount of the uniform mixture of ingredients is injected into the die of the press, compressed at a presure of from 11,000 to about 12,000 p.s.i. for a period ranging from 1 second up to 15 minutes or more and then removed from the die. A pressure of about 3,000 to 18,000 p.s.i. satisfactorily compresses the mixtures into the desired configurations. Pressures below this range run the risk of having the configuration disintegrate and pressures appreciably above this range reduce the solubility and/or erosion rate of the resulting configuration along with generating explosive forces within the chemical compositions being compressed.

The compositions of this invention can be used in various forms or configurations including granules, stick shapes, tablets, pills, pellets, briquettes, and the like, and may be used in any of the many apparatuses or devices which promote the treatment of fluid media with these compositions when subjected to the erosive or solubilizing action of the fluid media. Typical of the fluid media for which the compositions of this invention may be utilized are water or other aqueous media, aqueous sewage sources, aqueous plant effluent and gaseous media capable of reacting with the chlorine component of the composition. Also representative of the applications of the compositions of this invention are the treatment of water in swimming pools and other water circulation systems. Further utilization of appropriate coated chlorine-containing compositions of this invention are for bleaching, sterilizing and disinfecting applications.

Generally, to prepare the chlorine-substituted glycolurils a glycoluril or an alkyl-substituted glycoluril is chlorinated in an aqueous medium in the presence of an inorganic acid-binding alkali metal compound. The alkali metal compound is desirably selected from alkali metal carbonates, e.g., sodium carbonate; alkali metal bicarbonates, e.g., sodium bicarbonate; alkali metal borates, e.g., sodium borate; alkali metal silicates, e.g., sodium metasilicate; and alkali metal hydroxides, e.g., sodium hydroxide; and is preferably added to the aqueous medium in sufficient quantity to render it alkaline. The metallic hypochlorites are commercially available.

A further understanding of this invention will be obtained from the following specific examples which are intended to illustrate the invention but not to limit the scope thereof, parts and percentages being by weight unless otherwise indicated.

EXAMPLE 1

Preparation of chlorine-containing compositions

Commercial granular calcium hypochlorite containing a minimum of 70% available chlorine is blended with either powdered dichloroglycoluril and powdered tetrachloroglycoluril in two different batches to give mixtures consisting of up to 10% by weight of the chlorinated glycoluril component in the final product. The blending is done with a minimum of shearing action to prevent generation of heat in the composition during blending.

The mixtures are then tableted using a tableting press suitable to form the following tablets which are a round, flat tablet, 2⅝" in diameter and 13/16" in thickness. The tablet densities vary from 1.80 to 1.95.

Using this procedure, the first batch of composition is made using 19 lb. of granular commercial calcium hypochlorite and 1 lb. of powdered, dry dichloroglycoluril which are blended in an end-over-end tumbling mixer for 20 minutes. The second batch has 19 lb. of granular commercial calcium hypochlorite with 1 lb. of powdered, dry tetrachloroglycoluril, this mixture being blended in end-over-end tumbling mixer for 20 minutes. The two resulting mixtures are then tableted into 2⅝" diameter by 13/16" thick tablet using a Colton Press of 40-ton capacity. The resulting tablets containing dichloroglycoluril have a density of 1.84, weigh 131 g., and contain 73.6% available chlorine. The resulting tablets containing tetrachloroglycoluril have a density of 1.83, weigh 131 g., and contain 77.1% of available chlorine.

EXAMPLE 2

Initial control and regrowth control of bacteria in Sewage

This example demonstrates the initial control and regrowth control of bacteria in sewage on treatment through contact with a separate chemical component used in formulating the compositions of the present invention in the first phase of this experiment and the compositions of the present invention which combine these components in the second phase of this experiment.

(A) Individual chemicals.—The flow of fresh, unfiltered sewage from an extended aeration sewage treatment plant is split into three separate portions, each portion of which has a chlorine demand of 2.2 p.p.m. available chlorine. Calcium hypochlorite, dichloroglycoluril and tetrachloroglycoluril separately are used to treat one portion of these three portions in quantities sufficient to provide a dosage of 2.7 p.p.m. of available chlorine through each portion of the flow. Sewage portions are stirred using magnetic stirrers for 48 hours. Bacteriological analysis for *E. coli* concentration is made before chlorination and at ½, 5, 24 and 48 hour periods after chlorination. Analysis for chlorine residuals is made at the same time that the bacteriological samples are taken. Determination of available chlorine levels was made by standard iodometric methods. The bacteriological analysis for *E. coli* (gram-negative bactreia) is made in accordance with the membrane filter techniques in Standard Methods for the Examination of Water and Wastewater, APHA 12th Ed. 1965. The water is also examined for the presence of gram-positive bacteria, Enterococci group, at the same time. Table 1 presents the relative efficacy of the sanitizers used in this part of the experiment.

TABLE 1
Relative Efficacy of sanitizers

| Sanitizer | Ca(OCl)$_2$ | DCGU | TCGU |
|---|---|---|---|
| Initial dosage, p.p.m. | 2.7 | 2.7 | 2.7 |
| Cl residual, p.p.m. at: | | | |
| ½ hr | 1.4 | 1.8 | 2.7 |
| 5 hr | 0.37 | 1.1 | 0.74 |
| 24 hr | 0.0 | 0.7 | 0.7 |
| 48 hr | 0.0 | 0.0 | 0.37 |
| Initial E. coli/100 ml | 6.3×10$^5$ | 6.3×10$^5$ | 6.3×10$^5$ |
| Remaining E. coli/100 ml. at: | | | |
| ½ hr | 0 | 4.23×10$^5$ | 5.5×10$^5$ |
| 5 hr | 0 | 2.4×10$^5$ | 6×10$^2$ |
| 24 hr | 8.7×10$^3$ | 2×10$^2$ | 0 |
| 48 hr | 1×10$^3$ | 5×10$^2$ | 0 |
| Initial enterococci/100 ml | 2.55×10$^4$ | 2.55×10$^4$ | 2.55×10$^4$ |
| Remaining enterococci/100 ml. at: | | | |
| ½ hr | 0 | 2.51×10$^4$ | 2.57×10$^4$ |
| 5 hr | 0 | 3.7×10$^3$ | 2.4×10$^4$ |
| 24 hr | 0 | 0 | 0 |
| 48 hr | 0 | 0 | 0 |

NOTE.—Ca(OCl)$_2$=calcium hypochlorite. DCGU=dichloroglycoluril. TCGU=tetrachloroglycoluril.

The results show that calcium hypochlorite gives a rapid reduction of both *E. coli* and Enterococci but dissipates, thus not providing as long-term control of the coliforms as do the chlorinated glycolurils. The dichloro-glycoluril reacts more slowly and gives greater long-term control than does calcium hypochlorite but is not as effective for the longer term as tetrachloroglycoluril. The tetrachloroglycoluril reacts more slowly than calcium hypochlorite and the dichloroglycoluril, giving better long-term control than either calcium hypochlorite or the dichloroglycoluril.

(B) *Formulated compositions.*—Four 500 ml. portions of fresh filtered sewage having a chlorine demand of 1.6 p.p.m. are respectively treated by measured volumes from stock solutions of (1) 100% calcium hypochlorite, (2) 95% calcium hypochlorite and 5% glycoluril, (3) 95% calcium hypochlorite and 5% dichloroglycoluril and (4) 95% calcium hypochlorite and 5% tetrachloroglycoluril. Total dosage in each case is 1.70±.08 p.p.m. available chlorine. The solutions are stirred and bacteriological sampling is done before chlorination and at the period of ½, 5 and 25 hours after chlorination. Chlorine residuals are determined at the same time as the bacteriological sampling using the techniques under Part A. The results are presented in Table 2.

TABLE 2
Comparison of efficiency of sanitizer blends and calcium hypochlorite against *E. coli* in filtered sewage

| Sanitizer | Ca(OCl)$_2$ | Ca(OCl)$_2$ +GU | Ca(OCl)$_2$ +DCGU | Ca(OCl)$_2$ +TCGU |
|---|---|---|---|---|
| Initial dosage, p.p.m. Cl | 1.7 | 1.7 | 1.7 | 1.7 |
| Cl residual, p.p.m. Cl at: | | | | |
| ½ hr | 0.63 | 0.63 | 1.3 | 1.3 |
| 5 hr | 0.31 | 0.31 | 0.31 | 0.95 |
| 24 hr | 0.0 | 0.0 | 0.0 | 0.0 |
| Initial E. coli/100 ml | 3.7×10$^5$ | 3.7×10$^5$ | 3.7×10$^5$ | 3.7×10$^5$ |
| Remaining E. coli/100 ml. at: | | | | |
| ½ hr | 2×10$^2$ | 3×10$^2$ | 2×10$^2$ | 1×10$^2$ |
| 5 hr | 1×10$^2$ | 1×10$^2$ | 1×10$^2$ | 0 |
| 24 hr | 4×10$^4$ | 2×10$^4$ | 1.05×10$^4$ | 0 |

NOTE.—GU=glycoluril. DCGU=dichloroglycoluril. TCGU=tetrachloroglycoluril.

The results show that the combination of tetrachloroglycoluril with calcium hypochlorite gives more rapid kill and longer-term control of the coliform bacteria. Also the combination of dichloroglycoluril and calcium hypochlorite gives longer-term control than calcium hypochlorite, but requires initially slightly more concentration for achieving the same initial reduction in coliform population than does the tetrachloroglycoluril-calcium hypochlorite composition. Calcium hypochlorite used alone showed very poor control over regrowth of bacteria, even poorer than the combination of glycoluril and calcium hypochlorite.

EXAMPLE 3

Initial control and regrowth control of bacteria in sewage using compositions with 10% additive This example demonstrates the control of combinations of chlorinated glycolurils constituting 10% of the sanitizing mixture with calcium hypochlorite versus use of calcium hypochlorite alone against *E. coli* in unfiltered sewage. Stock solutions are prepared containing calcium hypochlorite and a chlorinated glycoluril additive in a ratio of 90 parts calcium hypochlorite to 10 parts additive along with a solution containing just calcium hypochlorite. The available chlorine concentrations in this solution are 994 p.p.m. chlorine for calcium hypochlorite, 129 p.p.m. chlorine for calcium hypochlorite with 10% glycoluril additive, 331 p.p.m. chlorine for calcium hypochlorite with 10% dichloroglycoluril additive and 350 p.p.m. chlorine for calcium hypochlorite with 10% additive of tetrachloroglycoluril. Four 500 ml. portions of fresh unfiltered sewage having a chlorine demand of 4.05 p.p.m. are respectively treated by measured volumes of the stock solutions to provide a dosage of 4.25 p.p.m. available chlorine in each case. Each portion is stirred and sampling for bacteriological analysis is done before chlorination and at ½, 5 and 24 hours after chlorination. Chlorine residuals are determined at the same time as the bacteriological sampling. The bacteriological and chlorine residual analyses are performed in accordance with Standard Methods as described in Example 2. The results of this experiment are presented in Table 3.

TABLE 3
Comparison of efficacy of sanitizer blends and calcium hypochlorite against *E. coli* in unfiltered sewage

| Sanitizer | Ca(OCl)$_2$ | Ca(OCl)$_2$ +GU | Ca(OCl)$_2$ +DCGU | Ca(OCl)$_2$ +TCGU |
|---|---|---|---|---|
| Initial dosage, p.p.m. Cl | 4.25 | 4.25 | 4.25 | 4.25 |
| Cl residual, p.p.m. Cl at: | | | | |
| ½ hr | 2.20 | 2.20 | 2.20 | 2.20 |
| 5 hr | 0.74 | 0.74 | 0.74 | 0.74 |
| 24 hr | 0.0 | 0.0 | 0.0 | 0.0 |
| Initial E. coli/100 ml | 2.69×10$^5$ | 2.69×10$^5$ | 2.69×10$^5$ | 2.69×10$^5$ |
| Remaining E. coli/100 ml. at: | | | | |
| ½ hr | 1.4×10$^3$ | 1.1×10$^3$ | 1.6×10$^3$ | 9×10$^2$ |
| 5 hr | 1.9×10$^3$ | 8×10$^3$ | 2×10$^3$ | 5×10$^2$ |
| 24 hr | 6.1×10$^4$ | 1.54×10 | 5×10$^4$ | 2×10$^4$ |

The results show that the composition containing 10% tetrachloroglycoluril and calcium hypochlorite gives greater kill and maintains a lower level of *E. coli* for periods up to 24 hr. than either of the other combinations or calcium hypochlorite by itself. The dichloroglycoluril combination with calcium hypochlorite is the next most effective composition for preventing regrowth.

EXAMPLE 4

Control of enterococcus group

This example attempts to determine the effectiveness of combinations of the chlorinated glycolurils constituting 10% of the sanitizing mixture with calcium hypochlorite against the enterococcus group in unfiltered sewage in comparison with the control of calcium hypochlorite against such organisms. The Enterococcus group contains several streptococcus organisms including *S. faecalis*. The experimental conditions, including the sewage samples to be treated and the solutions of the compositions, are the same as those used in Example 3. The bacteriological and chlorine residual determinations are also practiced as in Example 3. The results of this experiment are presented in Table 4.

TABLE 4

Comparison of efficacy of sanitizer blends and calcium hypochlorite against enterococci in unfiltered sewage

| Sanitizer | $Ca(OCl)_2$ | $Ca(OCl)_2$ +GU | $Ca(OCl)_2$ +DCGU | $Ca(OCl)_2$ +TCGU |
|---|---|---|---|---|
| Initial dosage, p.p.m. Cl | 4.25 | 4.25 | 4.25 | 4.25 |
| Cl residual, p.p.m. Cl at: | | | | |
| ½ hr | 2.20 | 2.20 | 2.20 | 2.20 |
| 5 hr | 0.74 | 0.74 | 0.74 | 0.74 |
| 24 | 0.0 | 0.0 | 0.0 | 0.0 |
| Initial enterococci 100 ml | $2.11 \times 10^4$ | $2.11 \times 10^4$ | $2.11 \times 10^4$ | $2.11 \times 10^4$ |
| Remaining enterococci 100 ml. at: | | | | |
| ½ hr | $2 \times 10^2$ | $5 \times 10^2$ | $2 \times 10^2$ | $2 \times 10^2$ |
| 5 hr | 0 | $1 \times 10^3$ | 0 | 0 |
| 24 hr | $3.45 \times 10^4$ | $1.4 \times 10^4$ | $1 \times 10^2$ | 0 |

The results show that the composition containing tetrachloroglycoluril and calcium hypochlorite gives equivalent kill of the Enterococci for the short term up to 5 hr. and better long-term control of the Enterococci up to 24 hr. than either of the other combinations or the calcium hypochlorite alone. The composition containing dichloroglycoluril and calcium hypochlorite gives the next best control of Enterococci over 24 hours.

EXAMPLE 5

Chlorination of sewage treatment plant effluent

This example tests the composition of 5% tetrachloroglycoluril and 95% calcium hypochlorite versus the composition of 100% calcium hypochlorite for a comparison of biocidal efficacy, consumption of the chemical and length of time of the control over bacterial regrowth of *E. coli*. The test is conducted in two side by side chemical dissolvers, each dissolver receiving one half of the effluent from a sewage treatment plant as divided by a flow splitter. The chemical dissolvers used are 28" in length (inlet to exit), 7" in width, 9" in height with a weir opening located 3" from the outlet. Each adjustable weir opening was 1" wide, with the weir consisting of a solid sheet of material of the dimensions of the dissolver unit except for the 1" opening, which 1" opening runs for the full 9" of the weir height. The weir opening causes an increase of ¼" in water height within the dissolver for each 2 gallons per minute of increment in flow of the water. Tubular holding means are employed for holding the tablets in this test, with each having 3⅛" inside diameter, 3½" outside diameter, and being 12" in height, with the lower 6" in height having a basket-like retainer with a strap network conforming to the shape of the cylinder for holding the chemical agent in the tubular means but enabling the aqueous medium in the dissolver to contact any chemical agent held within the tubes. One tube containing the test chemicals is placed in each dissolver so that the distance from the tube to the weir opening is 2". The distance between the bottom-most tablet in the feed tubes and the bottom of the dissolver is set at 3/16".

In one tube are placed fifteen tablets having a composition of 5 parts by weight of tetrachloroglycolouril and 95 parts by weight of commercial calcium hypochlorite. The tablets are 2⅝" in diameter and 13/16" in thickness, weighing 132 grams each with an available chlorine content of 77.1%. The tablets are coated with Chlorowax-70 to give 0.142% by weight. The total charge is 3.49 lb. In a second feed tube are placed fifteen tablets of calcium hypochlorite. The tablets are 2⅝" in diameter and 13/16" in thickness, weighing 131 grams each with an available chlorine content of 75.5%. The tablets are coated with a 0.098% Chlorowax-70 coating, and the total charge weighs 3.46 lb.

The two feed tubes are placed in their respective dissolvers and are left on stream for 21 days. The total effluent treated varies with 5 to $7 \times 10^3$ gallons per day, with each dissolver receiving one-half of this flow. Bacteriological sampling analysis is performed as described in Example 3 up to 5 hours after chlorination. At the end of 21 days, the tablets are removed and dried and the sanitizer consumption is determined. The results of this test are presented in Table 5.

TABLE 5

Comparison of efficacy and consumption of blended sanitizer and calcium hypochlorite

| Sanitizer | Sanitizer consumption, lb. avail. Cl/day | E. coli/100 ml. | Sample 1 | Sample 2 | Sample 3 |
|---|---|---|---|---|---|
| $Ca(OCl)_2$ | 0.1186 | Untreated | $2.6 \times 10^4$ | $1.06 \times 10^4$ | $1.48 \times 10^4$ |
| | | After ½ hour treatment | 0 | $2 \times 10^2$ | 0 |
| | | After 5 hours treatment | 0 | 0 | 0 |
| $Ca(OCl)_2$+TCGU | 0.0786 | Untreated | $2.6 \times 10^4$ | $1.06 \times 10^4$ | $1.48 \times 10^4$ |
| | | After ½ hour treatment | 0 | 0 | 0 |
| | | After 5 hours treatment | 0 | 0 | 0 |

The consumption of the formulated sanitizer tablets is determined to be 2.14 lb. of sanitizer or 1.65 lb. of available chlorine. The consumtpion of the calcium hypochlorite tablets is determined to be 3.27 lb. of sanitizer, or 2.47 lb. of available chlorine. The bacteriological results from Table 5 show that from random sampling the formulated sanitizer of 5% tetrachloroglycoluril with 95% calcium hypochlorite does an equivalent or better job for killing *E. coli* with use of roughly ⅓ less chemical than was used for calcium hypochlorite alone.

EXAMPLE 6

Twelve tablets of formulated sanitizer composed of 95% calcium hypochlorite and 5% tetrachloroglycoluril were compared with an equivalent number of calcium hypochlorite tablets not containing tetrachloroglycoluril.

The tablets are placed in their respective feed tubes and left on stream for 16 days. Bacteriological, chlorine residual, and chlorine demand analyses are performed according to the methods given in Example 5 above. The bacteriological analyses are performed on a prechlorinated sample and at ½ hour on the chlorinated samples. At the end of the test period, the consumption of the tablets is determined. The results show that the formulated sanitizer does a better job of bacteriological kill while using 20% less sanitizing material. See Table 6 below:

TABLE 6

Comparison of efficacy and consumption of formulated sanitizer and calcium hypochlorite

| | Tablet type | |
|---|---|---|
| | Formulated | $Ca(OCl)_2$ |
| Days on stream | 16 | 16 |
| Est. daily flow, g.p.d | $7 \times 10^3$ | $7 \times 10^3$ |
| Initial sanitizer charge, lb | 3.41 | 3.47 |
| Sanitizer consumption: | | |
| Total used, lb | 2.21 | 2.75 |
| Rate, lb./day | 0.137 | 0.172 |
| Available chlorine, percent | 71.5 | 73.5 |
| Rate, lb. avail. Cl/day | 0.098 | 0.126 |
| Cl residual avg., p.p.m. Cl | 3.29 | 4.30 |
| Dosage, avg., p.p.m. Cl | 6.08 | 7.09 |
| Initial *E. coli*/100 ml., range | (*) | (*) |
| *E. coli*/100 ml. remaining at ½ hr., avg | 625 | 5475 |
| Percent reduction, avg | 98.31 | 88.14 |

*$4 \times 10^4$ to $1.14 \times 10^5$.

EXAMPLE 7

Sanitizer evaluation was carried out as previously described in Example 6 above using two identical dissolvers with a flow proportioner. In this example coated/formulated tablets are compared with plain calcium hypochlorite tablets.

Eighteen tablets of formulated sanitizer composed of 95% calcium hypochlorite and 5% tetrachloroglycoluril and coated with 0.06% Chlorowax-70 are compared with an equivalent number of calcium hypochlorite tablets for bactericidal efficacy and consumption rate.

The tablets are placed in their respective feed tubes and left on stream for 21 days.

Bacteriological, chlorine residual and chlorine demand analyses are performed according to the methods given in Example 5 above. The bacteriological analyses for *E. coli* are performed on a prechlorinated sample and at ½ hour on the chlorinated samples.

At the end of the test period, the consumption of the tablets is determined.

The results show that the formulated/coated sanitizer does an equivalent or slightly better job of bacteriological kill while using 25% less sanitizing material. See Table 7 below.

TABLE 7

Comparison of efficacy and consumption of coated/formulated tablets and plain calcium hypochlorite tablets

|  | Coated/formulated tablets | Plain calcium hypochlorite tablets |
|---|---|---|
| Coating, percent Chlorowax-70 | 0.06 | 0.0 |
| Days on stream | 21 | 21 |
| Est. daily flow, g-p-d | 7×10³ | 7×10³ |
| Initial sanitizer charge, lb | 5.12 | 5.23 |
| Sanitizer consumption: | | |
| Total used, lb | 2.53 | 3.39 |
| Rate, lb./day | 0.121 | 0.161 |
| Available chlorine, percent | 71.5 | 75.5 |
| Rate, lb. avail. Cl/day | 0.086 | 0.122 |
| Chlorine residual, avg., p.p.m. Cl | 2.24 | 2.55 |
| Dosage, avg., p.p.m. Cl | 4.37 | 4.68 |
| Initial *E. coli*/100 ml., range | (*) | (*) |
| *E. coli* remaining at ½ hr., avg | 64 | 127 |
| Percent reduction, avg | 99.85 | 99.79 |

*2.6×10⁴ to 2.76×10⁵.

EXAMPLE 8

This example demonstrates the control obtained with combinations of chlorinated glycoluril constituting 2%, 15% and 25% by weight of the sanitizing mixture with calcium hypochlorite versus use of calcium hypochlorite alone against *E. coli* in unfiltered sewage. Efficacy of the combinations was determined by the procedure given in Example 2B above.

Four 500 ml. portions of fresh, unfiltered, treated sewage having a chlorine demand of 1.47 p.p.m. are respectively treated by adding measured volumes of stock solutions of (1) 100% calcium hypochlorite, (2) 98% calcium hypochlorite and 2% tetrachloroglycoluril, (3) 85% calcium hypochlorite and 15% tetrachloroglycoluril, and (4) 75% calcium hypochlorite and 25% tetrachloroglycoluril. Sufficient stock solution to provide a total dosage of 1.97 p.p.m. available chlorine is used to treat each sample of sewage. The samples are stirred and bacteriological sampling is done (a) before chlorination and (b) at ½ hour after chlorination. Chlorine residuals are determined at the same time as bacteriological sampling. Results are presented in Table 8 below. These results show that combinations of tetrachloroglycoluril and calcium hypochlorite are essentially equal to or better than calcium hypochlorite alone in reducing the coliform population in sewage. As has been shown in Example 2, Tables 1 and 2 above, combinations containing the chlorinated glycolurils provide consistently high chlorine residuals than calcium hypochlorite alone. At the 2% additive level, blended composition (2) does not appear to be advantageous over calcium hypochlorite alone.

TABLE 8

Comparison of efficacy of various sanitizer blends and calcium hypochlorite against *E. coli* in filtered sewage

|  | Ca(OCl)₂ | Ca(OCl)₂ +2% TCGU | Ca(OCl)₂ +15% TCGU | Ca(OCl)₂ +25% TCGU |
|---|---|---|---|---|
| Initial dosage, p.p.m. Cl | 1.97 | 1.97 | 1.97 | 1.97 |
| Cl residual at ½ hr., p.p.m. Cl | 0.74 | 1.12 | 1.12 | 1.12 |
| Initial *E. coli*/100 ml | 1.77×10⁵ | 1.77×10⁵ | 1.77×10⁵ | 1.77×10⁵ |
| Remaining *E. coli*/100 ml. at ½ hr | 2.6×10³ | 3.6×10³ | 7×10² | 1×10² |

It is to be understood that although the invention has been described with specific reference to particular embodiments thereof, it is not to be so limited since changes and alterations therein may be made which are within the full intended scope of this invention as defined in the appended claims.

What is claimed is:

1. A chlorine-containing composition comprising as essential active ingredients a mixture of calcium hypochlorite and a chlorinated glycoluril selected from the group consisting of
    (a) a mixture having from about 98% to about 75% by weight of calcium hypochlorite and from about 2% to about 25% by weight of 1,3,4,6-tetrachloroglycoluril; and
    (b) a mixture having from about 98% to about 75% by weight of calcium hypochlorite and from about 2% to about 25% by weight of dichloroglycoluril.

2. The composition of claim 1 wherein the chlorinated glycoluril constitutes up to about 25% by weight of the composition.

3. The composition of claim 1 wherein the chlorinated glycoluril constitutes about 2% by weight of the composition.

4. The composition of claim 2 wherein the chlorinated glycoluril is 1,3,4,6-tetrachloroglycoluril.

5. The composition of claim 2 wherein the chlorinated glycoluril is dichloroglycoluril.

6. A method of treating an aqueous medium to eliminate bacteria therefrom and to prevent regrowth of the bacteria comprising treating the medium with
    (a) a mixture having from about 98% to about 75% by weight of calcium hypochlorite and from about 2% to about 25% by weight of 1,3,4,6-tetrachloroglycoluril; and
    (b) a mixture having from about 98% to about 75% by weight of calcium hypochlorite and from about 2% to about 25% by weight of dichloroglycoluril.

7. The method of claim 6 wherein the chlorinated glycoluril constitutes up to about 25% by weight of the composition.

8. The method of claim 6 wherein the chlorinated glycoluril constitutes about 2% by weight of the composition.

9. The method of claim 6 wherein the chlorinated glycoluril in the composition is 1,3,4,6-tetrachloroglycoluril.

10. The method of claim 6 wherein the chlorinated glycoluril in the composition is dichloroglycoluril.

References Cited
UNITED STATES PATENTS
3,252,901  5/1966  Zettler _____ 210—62
3,445,383  5/1969  Horvath et al. _____ 424—273

OTHER REFERENCES
Slezak et al.: Chem. Abst. (1964), p. 13333h.
Merck Index—7th edition, 1960, p. 194.

SAM ROSEN, Primary Examiner

U.S. Cl. X.R.

424—251

UNITED STATES PATENT OFFICE
CERTIFICATE OF CORRECTION

Patent No. 3,629,408   Dated December 21, 1971

Inventor(s) Roland J. Horvath and Charles G. Parsons

It is certified that error appears in the above-identified patent and that said Letters Patent are hereby corrected as shown below:

Column 1, line 37, after "be", add --used to supply available chlorine to aqueous media, the--.

Column 1, line 39, after "Calcium", add --hypochlorite--.

Column 6, line 66, change "enterococcus" to --Enterococcus--.

Column 6, line 69, change "streptococcus" to --Streptococcus--.

Signed and sealed this 23rd day of May 1972.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,629,408　　　　　　　Dated　December 21, 1971

Inventor(s)　Roland J. Horvath and Charles G. Parsons

It is certified that error appears in the above-identified patent and that said Letters Patent are hereby corrected as shown below:

Column 2, line 37, change "-tetra-" to --tetraza--;

Column 2, line 68, change "-tetrabicyclo" to --tetrazabicyclo--;

Column 3, line 18, change "ingedients" to --ingredients--;

Column 4, line 28, change 2-5/6" to --2-5/8"--;

Column 5, line 24, "Enterococci" should be italicized;

Column 5, line 26, change "dichloro-gly-" to --dichlorogly- --;

Column 5, line 51, Table 2, change "efficiency" to --efficacy--;

Column 6, line 49, Table 3, last entry under heading "Ca(OCl)$_2$ + GU" change "1.54 x 10" to --1.54 x 10$^5$--;

Column 8, line 36, change "consumtpion" to --consumption--;

Column 10, Claim 6, line 61, after "with" insert --a mixture of calcium hypochlorite and a chlorinated glycoluril selected from the group consisting of--.

Signed and sealed this 26th day of September 1972.

(SEAL)
Attest:

EDWARD M. FLETCHER, JR.　　　　　　　ROBERT GOTTSCHALK
Attesting Officer　　　　　　　　　　Commissioner of Patents